(12) United States Patent
Kato et al.

(10) Patent No.: US 10,513,291 B2
(45) Date of Patent: Dec. 24, 2019

(54) AUTOMATIC TILTING VEHICLE

(71) Applicant: TOYOTA JIDOSHA KABUSHIKI KAISHA, Toyota-shi, Aichi-ken (JP)

(72) Inventors: Yoshihisa Kato, Miyoshi (JP); Takashi Murakami, Toyota (JP); Satoshi Adachi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 33 days.

(21) Appl. No.: 15/964,404

(22) Filed: Apr. 27, 2018

(65) Prior Publication Data

US 2018/0319436 A1 Nov. 8, 2018

(30) Foreign Application Priority Data

May 2, 2017 (JP) .................. 2017-091910

(51) Int. Cl.
| | |
|---|---|
| *B62D 9/02* | (2006.01) |
| *B60G 7/00* | (2006.01) |
| *B62K 5/10* | (2013.01) |
| *B62K 5/027* | (2013.01) |
| *B62K 25/04* | (2006.01) |

(Continued)

(52) U.S. Cl.
CPC .............. *B62D 9/02* (2013.01); *B60G 7/001* (2013.01); *B60G 21/007* (2013.01); *B60G 21/05* (2013.01); *B62K 5/027* (2013.01); *B62K 5/05* (2013.01); *B62K 5/08* (2013.01); *B62K 5/10* (2013.01); *B62K 19/02* (2013.01); *B62K 25/04* (2013.01); *B60G 17/0152* (2013.01); *B60G 2200/132* (2013.01); *B60G 2202/32* (2013.01); *B60G 2202/422* (2013.01); *B60G 2204/422* (2013.01); *B60G 2204/8302* (2013.01); *B60G 2206/016* (2013.01); *B60G 2206/11* (2013.01); *B60G 2300/122* (2013.01); *B60G 2300/45* (2013.01);

(Continued)

(58) Field of Classification Search
CPC . B62D 9/02; B62D 9/04; B60G 7/001; B60G 7/007; B60G 3/16; B60G 3/28; B60G 9/00; B62K 5/10
See application file for complete search history.

(56) References Cited

U.S. PATENT DOCUMENTS

| 4,334,693 A * | 6/1982 | Huber ..................... B60G 3/28 |
| | | 280/124.143 |
| 9,145,168 B2 * | 9/2015 | Spahl ..................... B62D 9/02 |

(Continued)

FOREIGN PATENT DOCUMENTS

| CN | 102245410 A | 11/2011 |
| CN | 103124671 A | 5/2013 |
| JP | 2012-081784 A | 4/2012 |

*Primary Examiner* — Faye M Fleming
(74) *Attorney, Agent, or Firm* — Sughrue Mion, PLLC (57) ABSTRACT

An automatic tilting vehicle including a pair of wheels rotatably supported by wheel carriers and laterally spaced apart and a vehicle tilting device that tilts the vehicle to the inside of a turn when turning. The vehicle tilting device includes a swing member, an actuator that swings the swing member about a swing axis, and a pair of connecting rods pivotally attached to the swing member and the wheel carriers on both lateral sides of the vehicle. Each connecting rod has a preset weakest portion that is buckled to be deformed in a preset direction in a preset area when a buckling load equal to or larger than a preset value is applied.

5 Claims, 8 Drawing Sheets

(51) Int. Cl.
*B60G 21/00* (2006.01)
*B60G 21/05* (2006.01)
*B62K 5/05* (2013.01)
*B62K 5/08* (2006.01)
*B62K 19/02* (2006.01)
*B60G 17/015* (2006.01)
*B62K 5/00* (2013.01)

(52) U.S. Cl.
CPC .. *B60G 2800/019* (2013.01); *B62K 2005/001* (2013.01)

(56) References Cited

U.S. PATENT DOCUMENTS

| | | |
|---|---|---|
| 2011/0272911 A1 | 11/2011 | Gerhards et al. |
| 2013/0193656 A1 | 8/2013 | Itoh et al. |
| 2018/0264905 A1* | 9/2018 | Kimura .............. B60G 17/0182 |

* cited by examiner

AUTOMATIC TILTING VEHICLE

CROSS-REFERENCE TO RELATED APPLICATION

The disclosure of Japanese Patent Application NO. JP2017-91910 filed on May 2, 2017 is incorporated by reference in its entirety.

BACKGROUND

1. Technical Field

The present disclosure relates to an automatic tilting vehicle that automatically tilts (self inclines) to the inside of a turn when turning.

2. Description of the Related Art

An automatic tilting vehicle has a vehicle tilting device, and the vehicle is automatically tilted to the inner side of a turn by the vehicle tilting device at the time of turning. For example, Japanese Patent Application Laid-open No. 2012-81784 discloses an automatic tilting vehicle that includes a pair of wheels spaced laterally, a swing type vehicle tilting device, and a control unit that controls the vehicle tilting device, and the pair of front wheels are rotatably supported by corresponding wheel carriers (knuckles). The vehicle tilting device includes a swing member swingable about a swing axis extending in a longitudinal direction of the vehicle, an actuator that swings the swing member about the swing axis, and a pair of connecting rods that are disposed on both sides transverse to the swing axis. Each connecting rod is pivotally connected to the swing member at an upper end pivot point and pivotally attached to the corresponding wheel carrier at a lower end pivot point and extends substantially in the vertical direction.

When the swing member swings about the swing axis, the pair of connecting rods move up and down in opposite directions to each other, so that the right and left wheels move up and down in opposite directions with respect to a vehicle body, whereby the vehicle is inclined in the lateral direction. The control unit is configured to calculate a target tilt angle of the vehicle for stably running the vehicle based on a steering operation amount of a driver and a vehicle speed, and to tilt the vehicle so that a tilt angle of the vehicle becomes the target tilt angle by controlling the swing angle of the swing member by the actuator.

Each connecting rod receives a compressive load for supporting the vehicle body, and the compressive load increases on the turning outer wheel side and decreases on the turning inner wheel side by the operation of the vehicle tilting device. The pair of connecting rods have high strength so that unnecessary deformation or the like does not occur even if the compressive load varies due to the operation of the vehicle tilting device when the vehicle is traveling.

In the swing type vehicle tilting device, when an impact load acts on one of the front wheels due to the front wheel riding over an obstacle, for example, the load is transmitted to the swing member and the actuator via the connecting rod. Therefore, when an impact load is very high, the swing member and/or the actuator may be damaged without damaging the connecting rod, and it may be necessary to replace them.

In general, replacement of a swinging member and/or an actuator is more difficult than replacement of a connecting rod, and a swinging member and an actuator are more expensive than a connecting rod. Therefore, when a swing member and/or an actuator are damaged, the swing member and/or the actuator must be replaced with labor, time, and cost that are more than those when replacing a connecting rod.

SUMMARY

The present disclosure provides an automatic tilting vehicle having a swing type vehicle tilting device in which, when an excessive impact load acts on a front wheel, buckling deformation of a connecting rod reduces the possibility that a swing member and/or an actuator will be damaged.

According to the present disclosure, an automatic tilting vehicle is provided which comprises a pair of wheels spaced laterally and supported rotatably by corresponding wheel carriers and a vehicle tilting device configured to tilt the vehicle to the inside of a turn when the vehicle is turning, the vehicle tilting device including a swing member swinging about a swing axis extending in the front-rear direction, an actuator that is configured to swing the swing member about the swing axis, and a pair of connecting rods pivotally attached to the swing member at upper end pivoting portions and pivotally attached to corresponding wheel carriers at lower end pivoting portions on both lateral sides.

Each connecting rod has a preset weakest portion configured to be buckled to deform the connecting rod in a preset direction in a preset area when a buckling load equal to or larger than a preset value is applied.

According to the above configuration, each of the pair of connecting rods has the preset weakest portion. When a buckling load exceeding the preset value acts on the corresponding connecting rod, the preset weakest portion is buckled to deform the connecting rod in a preset direction in a preset area.

Therefore, for example, when a high impact load acts on any one of the front wheels due to riding on an obstacle or the like and a high buckling load equal to or larger than the preset value acts on the corresponding connecting rod, the connecting rod is buckled to be deformed at the preset weakest portion. Since an impact load is absorbed by the buckling deformation of the connecting rod, the load transmitted from the connecting rod to the swing member and the actuator is reduced. Consequently, it is possible to reduce the possibility that the swing member and the actuator are damaged when a high impact load is applied to the front wheels as compared with a conventional automatic tilting vehicle in which no preset weakest portions are provided in connecting rods.

Even if a high compressive load acts on a connecting rod, when the compressive load is less than the preset value, the connecting rod will not be buckled and deformed. The function of the vehicle tilting device is not impaired that tilts the vehicle to the inside of a turn by swinging the swing member about the swing axis so that the pair of connecting rods are moved up and down in opposite directions to vertically move the left and right wheels in opposite directions with respect to the vehicle body.

In general, a price of a connecting rods is less than prices of a swing member and an actuator, and a replacement of the connecting rod is easier than replacements of the swing member and actuator. Therefore, as compared to where the swing member or the actuator is damaged preferentially over the connecting rods, it is possible to reduce the parts replacement cost and to exchange parts easily and in a short time.

Furthermore, a buckling deformation of a connecting rod occurs in a preset direction in a preset area. Accordingly, it is possible to reduce the possibility that other members of the vehicle are damaged by a connecting rod when it is buckled to be deformed, as compared to where an area and a direction in which a connecting rod is buckled to be deformed are not set in advance.

In one aspect of the present disclosure, the preset direction is laterally outward of the vehicle as seen from above the vehicle.

According to the above aspect, the preset direction is outward in the lateral direction of the vehicle as viewed from above the vehicle. Therefore, as compared to where a connecting rod is buckled to be deformed in a direction other than outward in the lateral direction of the vehicle, it is possible to reduce the possibility that an internal structure or the like positioned between the pair of connecting rods is damaged by a buckling deformation of a connecting rod.

When the vehicle is traveling, a longitudinal force due to a longitudinal force acting between the front wheels and the vehicle body acts on each connecting rod. Since the direction of the buckling deformation of each connecting rod at the preset weakest portion is laterally outward of the vehicle, it is possible to reduce the possibility that the strength of the connecting rod will be insufficient with respect to a longitudinal force as compared to where a buckling deformation direction is the front or the rear of the vehicle.

It is to be noted that "outward in the lateral direction of the vehicle" is outward in the range of 30 degrees or less to the front or rear of the vehicle from the lateral direction perpendicular to a center plane of the vehicle extending in the longitudinal direction and the vertical direction as viewed from the above of the vehicle.

In another aspect of the present disclosure, the preset value is a value at which a connecting rod is buckled to be deformed at the preset weakest portion in preference to damages of the swing member and the actuator in a situation where a compressive load acts on the connecting rod.

According to the above aspect, a compressive load that buckled to deform a connecting rod at the preset weakest portion is lower than a compressive load that damages the swing member and/or the actuator. Consequently, when a high impact load is applied to any one of the front wheels, and a high buckling load equal to or larger than a preset value acts on the corresponding connecting rod, it is buckled to be deformed without damaging the swing member and the actuator. Therefore, it is possible to effectively reduce the possibility that the swing member and/or the actuator are damaged before a connecting rod is buckled to be deformed when a high impact load is applied to a front wheel, as compared to where the preset value is not the above value. As a matter of course, the preset value is set so that any connecting rod is not buckled to be deformed when a compressive load acting on the connecting rod is within a range of the load caused during a normal running of the vehicle.

In another aspect of the present disclosure, the pair of wheels each includes a wheel member rotatably supported by the wheel carrier and a tire mounted on an outer periphery of the wheel member, and a center of the preset weakest portion is located above an upper edge of a portion of the corresponding wheel member closest to the center.

According to the above aspect, it is possible to reduce the possibility that rotation of the front wheel is hindered due to the center of the preset weakest portion being brought into contact with the wheel member caused by a buckling deformation of a connecting rod, as compared to where the center of the preset weakest portion is located below the upper edge of the wheel member at the portion closest to the center.

In another aspect of the present disclosure, the center of the preset weakest portion is located above an upper edge of a portion of the corresponding tire that is closest to the center.

According to the above aspect, it is possible to reduce the possibility that smooth rotation of the front wheel is hindered due to the center of the preset weakest portion being brought into contact with the tire to deform the tire caused by a buckling deformation of the connecting rod, as compared to where the center of the preset weakest portion is located below the upper edge of the tire at the portion closest to the center.

Other objects, other features and attendant advantages of the present disclosure will be readily understood from the description of the embodiments of the present disclosure described with reference to the following drawings.

DETAILED DESCRIPTION

Embodiments of the present disclosure will now be described in detail with reference to the accompanying drawings.

First Embodiment

Figure 1:
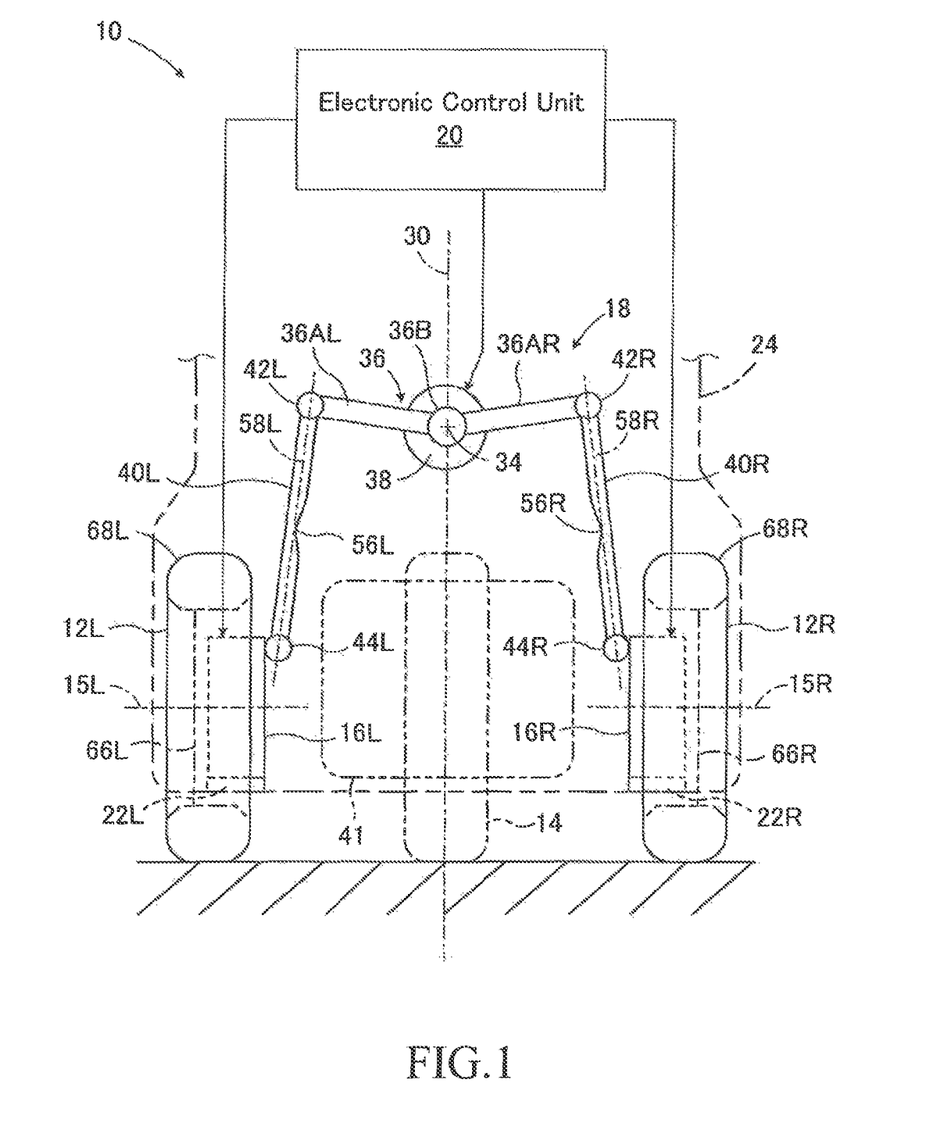
FIG. 1 is a rear view showing a first embodiment of an automatic tilting vehicle according to the present disclosure as seen from the rear of the vehicle.
Figure 2:
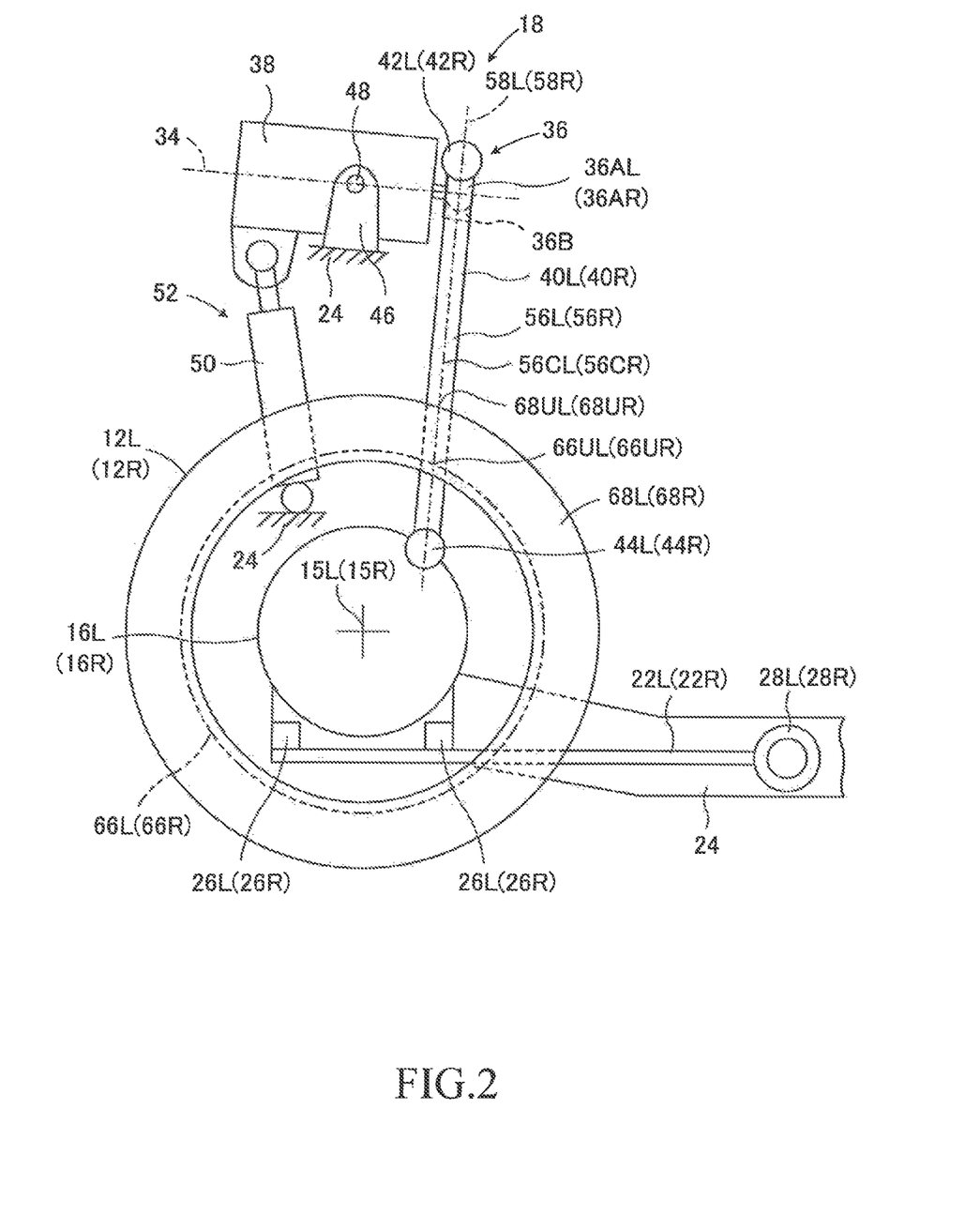
FIG. 2 is a side view showing the automatic tilting vehicle of the first embodiment as viewed from the left side of the vehicle.
Figure 3:
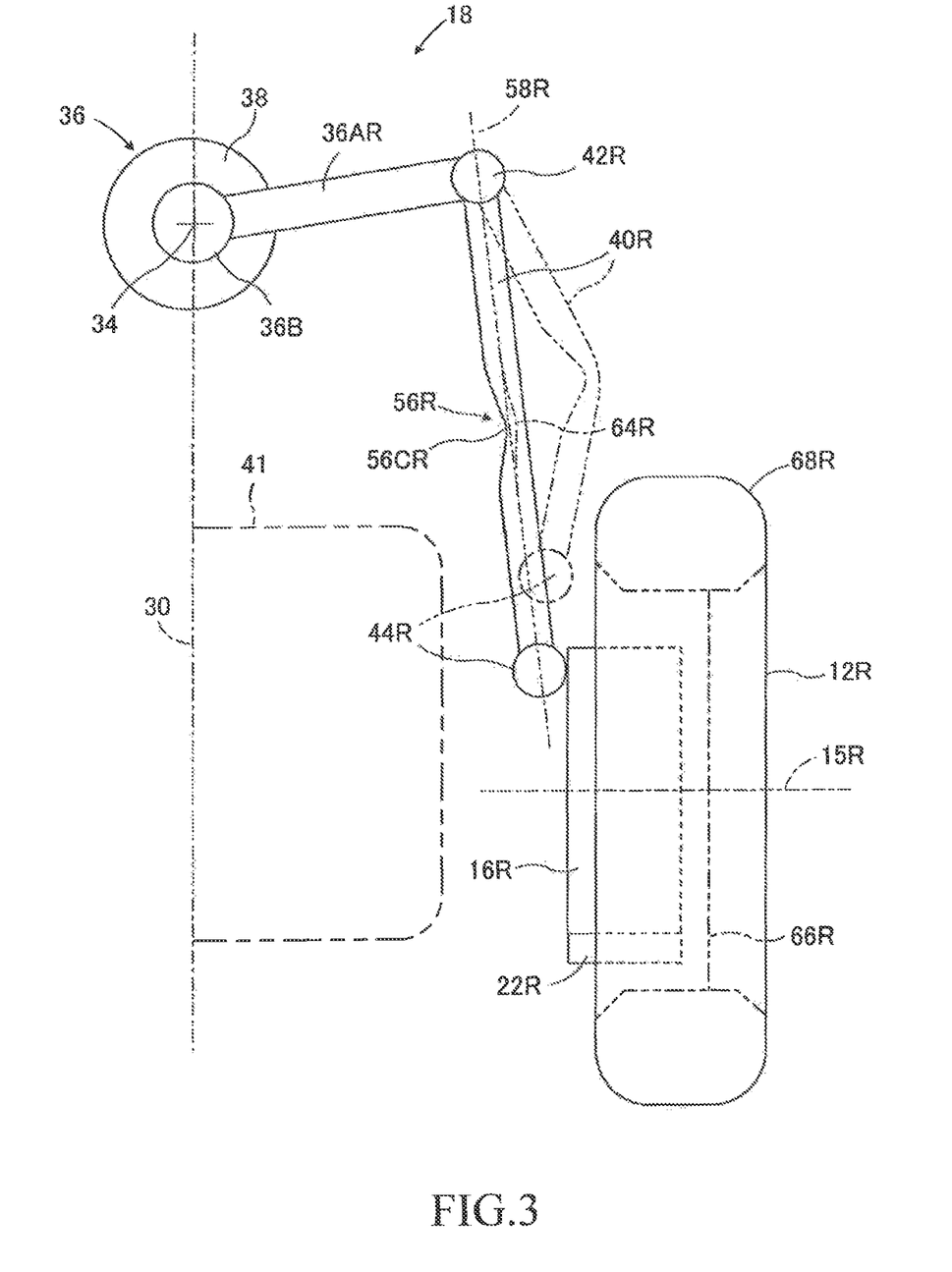
FIG. 3 is an enlarged partial view showing the right half of the vehicle tilting device according to the first embodiment.

In FIGS. 1 to 3, an automatic tilting vehicle 10 according to a first embodiment of the present disclosure is a three-wheeled vehicle that includes a pair of front wheels 12L and 12R which are non-steered driven wheels and a single rear wheel 14 which is a steered driven wheel. The front wheels 12L and 12R are spaced apart from each other in the lateral direction and are supported by corresponding wheel carriers 16L and 16R to rotate about rotation axes 15L and 15R, respectively. The automatic tilting vehicle 10 further includes a vehicle tilting device 18 and an electronic control unit 20. It should be noted that the rear wheel 14 may be a driving wheel or may be replaced by two wheels with a smaller tread than the front wheels.

In the embodiment, a camber of the front wheels 12L and 12R is a neutral camber, but may be a negative camber or a positive camber. The rear wheel 14 is positioned rearwardly with respect to the front wheels and, although not shown in the drawings, is supported by the rear wheel suspension so as to be vertically displaceable with respect to the vehicle body 24 and to restrict lateral displacement and inclination with respect to a vehicle body 24. Further, the rear wheel 14 is steered in a steer-by-wire manner by a steering device being controlled by the electronic control unit 20 according to an amount of steering wheel operation by a driver.

In the illustrated embodiment, the wheel carriers 16L and 16R each incorporate an in-wheel motor as a driving device, which is not shown in the drawings. A rotational direction and an output of the in-wheel motors are controlled by the electronic control unit 20 according to operation amounts of a shift lever and an accelerator pedal (neither shown) by the driver. Braking forces of the front wheels 12L and 12R and the rear wheel 14 are controlled by the electronic control unit 20 controlling a braking device which operates according to an operation amount of a brake pedal (not shown) by the driver.

The wheel carriers 16L and 16R are supported by corresponding suspension arms 22L and 22R so as to be vertically displaceable with respect to the vehicle body 24 and to restrict lateral displacement and inclination with respect to the vehicle body 24. The illustrated suspension arms 22L and 22R are leading arms that are integrally connected at their front ends to the wheel carriers 16L and 16R by joints 26L and 26R, respectively, and are connected at their rear ends to the vehicle body 24 by joints 28L and 28R, respectively.

The pair of joints 26L and 26R may be joints such as rubber bushing devices which are spaced apart in the front-back direction and have, for example, axes extending substantially in the vertical direction. The joints 28L and 28R may be joints such as rubber bushing devices having axes extending substantially in the lateral direction. As long as the above requirements relating to the wheel carriers 16L and 16R are satisfied, the suspension arms 22L and 22R may be other arms such as trailing arms or a combination of upper and lower arms.

The vehicle tilting device 18 includes a swing member 36 that swings about a swing axis 34 slightly inclining rearward and extending in the longitudinal direction of the vehicle, a tilt actuator 38 that swings the swing member 36 about the swing axis 34, and a pair of connecting rods 40L and 40R. Although, for convenience of explanation, the electronic control unit 20 is illustrated above the vehicle tilting device 18 in FIG. 1, it may be housed in an internal structure body 41 provided between the front wheels 12L and 12R.

The connecting rods 40L and 40R extend substantially in the vertical direction on both lateral sides of the swing axis 34 and are pivotally connected at their upper ends to the corresponding outer ends of the swing member 36 by joints 42L and 42R. It is preferable that the joints 42L and 42R are joints each including a pivot pin with a rubber bush having an axis extending substantially in the vehicle longitudinal direction, but they may be joints such as ball joints. The illustrated connecting rods 40L and 40R are straight, but may be at least partially curved.

Further, the connecting rods 40L and 40R are pivotally connected at the lower ends to the upper ends of the wheel carriers 16L and 16R by joints 44L and 44R such as ball joints, respectively. The lateral spacing of the centers of the joints 44L and 44R is larger than the lateral spacing of the centers of the joints 42L and 42R. In the case where a pair of auxiliary arms extending in the vertical direction are provided and the lower ends of the auxiliary arms are fixed to the corresponding suspension arms 22L and 22R, the connecting rods 40L and 40R may be pivotally connected to the upper ends of the corresponding auxiliary arms. In that case, the lower ends of the connecting rods 40L, 40R are integrally connected to the wheel carriers 16L, 16R via the corresponding auxiliary arms and the suspension arms 22L, 22R, respectively.

The swing member 36 has a boss portion 36B rotatable about the swing axis 34 and arm portions 36AL and 36AR integrally formed with the boss portion 36B and extending in opposite directions from the boss portion 36B, and functions as a swing arm member that can swing about the swing axis 34. Effective lengths of the arm portions 36AL and 36AR, that is, the distance between the axis 34 and the center of the joint 42L and the distance between the axis 34 and the center of the joint 42R are the same.

The tilt actuator 38 may be a rotary electric actuator such as a harmonic drive (registered trade mark) including an electric motor 38M such as a DC brushless motor and a reduction gear not shown in the figures. An output rotary shaft of the actuator 38 protrudes rearward and the boss portion 36B is fixedly attached to the tip of the output rotary shaft so that the rotary motion of the electric motor 38M is transmitted as a swing motion to the swing member 36. The actuator 38 may be a reciprocating type or a swing type actuator. In the former case, a reciprocating motion of the actuator is converted into a swing motion by a motion converting mechanism and is transmitted to the swing member 36.

As shown in FIG. 2, the actuator 38 is arranged between a pair of brackets 46 laterally spaced and fixed to the vehicle body 24. The actuator 38 has a pair of pivot shafts 48 protruding laterally away from each other and is pivotally supported about the pivot shafts 48 as the shafts are rotatably supported by the brackets 46. A shock absorber 50 and a suspension spring (not shown) are interposed between the front end portion of the actuator 38 and the vehicle body 24 below the front end portion. Therefore, the actuator 38 is connected to the vehicle body via the shock absorber 50 and the suspension spring, not shown, so that displacement and inclination of the actuator 38 in the lateral direction with respect to the vehicle body are restricted but the actuator can vertically displace with respect to the vehicle body 24 at the front end portion and the rear end portion. It should be noted that the suspension spring may be an elastic member such as a compression coil spring.

The shock absorber 50 and the suspension spring cooperate with the suspension arms 22L and 22R and the like to constitute a front wheel suspension 52. The front wheels 12L, 12R and the vehicle tilting device 18 are suspended from the vehicle body 24 by the front wheel suspension 52 so that they can move upward and downward with respect to the vehicle body 24 but lateral displacement and inclination with respect to the vehicle body are limited. A relative vertical vibration between the front wheels 12L, 12R and the vehicle body 24 generated when the vehicle is running is attenuated by the shock absorber 50. An impact that the front wheels 12L, 12R receive from a road surface and transmitted to the vehicle body 24 is alleviated by a suspension spring not shown in the figures.

The actuator 38 receives a downward force via the pair of brackets 46 due to the gravity acting on the vehicle body 24. However, since the actuator 38 is prevented from being displaced downward by the vehicle tilting device 18, the actuator tries to swing about the pivot shafts 48 so that the rear portion is displaced upward with respect to the vehicle body 24 and the front portion is displaced downward with respect to the vehicle body 24. Therefore, since the suspension spring is compressively deformed, a weight of the vehicle body 24 is supported by a spring force by compression deformation of the suspension spring. An amount of compressive deformation of the suspension spring increases when the front wheels 12L and 12R bounce and the rear portion of the actuator 38 is displaced upward, and conversely decreases when the front wheel rebounds and the rear portion of the actuator 38 is displaced downward.

Although not shown in figures, when the swing member 36 swings about the swing axis 34, the connecting rods 40L and 40R vertically move in opposite directions, so that the front wheels 12L and 12R move up and down in opposite directions with respect to the vehicle body 24, whereby the vehicle 10 is inclined in the lateral direction. In particular, the swing member 36 swings so that the connecting rod on the inner side of a turn rises and the connecting rod on the outer side of the turn descends, whereby the vehicle 10 is inclined toward the inner side of the turn.

A tilt angle of the vehicle 10 is controlled by the actuator 38 of the vehicle inclination device 18 being controlled by the electronic control unit 20. The electronic control unit 20 calculates an estimated lateral acceleration of the vehicle based on a steering angle equal to the rotation angle of the steering wheel (not shown) and a vehicle speed, and calculates a target tilt angle of the vehicle 10 based on the estimated lateral acceleration. Further, the electronic control unit 20 calculates a target rotation angle of the electric motor of the actuator 38 based on the target tilt angle, and controls the electric motor so that a rotation angle of the electric motor becomes the target rotation angle. Further, the electronic control unit 20 calculates a target turning angle of the rear wheel 14 based on the steering angle and the vehicle speed, and steers the rear wheels 14 in a steer-by-wire manner by controlling a steering actuator not shown in the figures so that a steered angle of the rear wheel becomes the target steered angle.

The connecting rods 40L and 40R each receive a compressive load for supporting the vehicle body 24. When the vehicle tilting device 18 is activated, the compressive load increases on the outer turning wheel side and decreases on the turning inner wheel side. The connecting rods 40L and 40R are configured so as not to be substantially bent and deformed even when the compressive load varies due to the operation of the vehicle tilting device 18 during normal running of the vehicle 10.

Figure 4A:
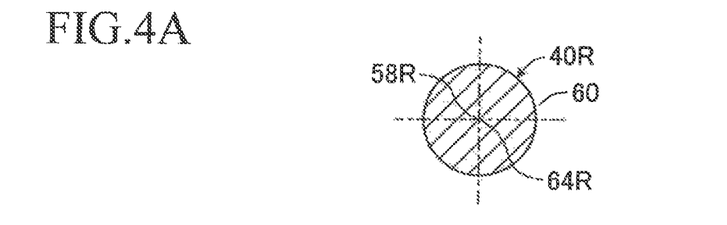
FIG. 4A is an enlarged sectional view showing a cross section of a region other than a preset weakest portion of the right connecting rod in the first embodiment.
Figure 4B:
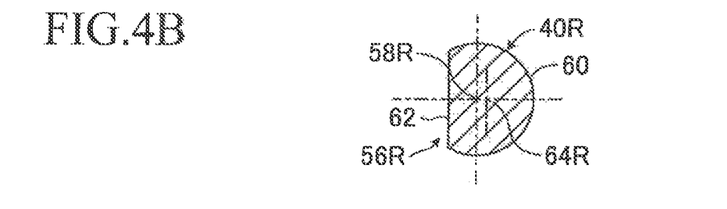
FIG. 4B is an enlarged cross-sectional view showing a cross section at the center of the preset weakest portion of the right connecting rod in the first embodiment.
Figure 4C:
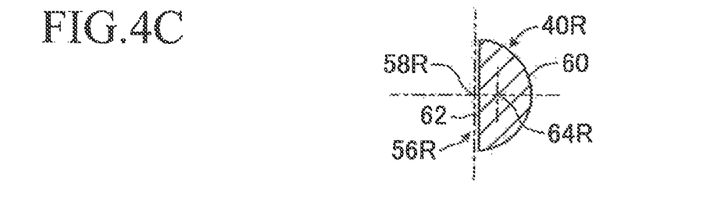
FIG. 4C shows a modification of the cross section at the center of the preset weakest portion of the right connecting rod in the first embodiment.

In particular, in the first embodiment, as shown in FIGS. 3, 4B and 4C, the connecting rods 40L and 40R have preset weakest portions 56L and 56R, respectively, at the intermediate portions between the upper and lower ends. Each of the weakest portions 56L and 56R is configured to be buckled to be deformed in a preset direction in a preset area when a buckling load (compressive load) P equal to or larger than a preset value Pb (positive constant) is applied to the connecting rods 40L and 40R, respectively. The preset areas are centers 56CL and 56CR of the weakest portions and the surrounding areas, and the preset direction is laterally outward of the vehicle 10. The above-described configurations relating to the weakest portions 56L and 56R are similar for the preset weakest portions in the second embodiment and the first to sixth modified embodiments described later.

The connecting rods 40L and 40R of the first embodiment linearly extend along center lines 58L and 58R, respectively, and, as shown in FIG. 4A, are solid rod members having a circular cross-sectional shapes except for the weakest portions 56L and 56R. As shown in FIGS. 3, 4B and 4C, the weakest portion 56R has a sectional shape of a partial circle determined by a circular arc 60 that is the same as other regions and a straight line 62 that extends substantially in the front-rear direction on the lateral inside of the vehicle 10. As shown in FIG. 3, a length of the straight line 62 is the largest at the center 56CR and gradually decreases with distance from the center 56CR in the vertical direction. As shown in FIG. 4B, the straight line 62 at the center 56CR is located on the inner side in the lateral direction of the vehicle with respect to the center line 58R. However, as shown in FIG.

4C, the straight line 62 may be located on the lateral outside of the vehicle with respect to the center line 58R.

Therefore, a shearing center line 64R connecting shearing centers of the connecting rod 40R is located at the same position as the center line 58R in the regions other than the weakest portion 56R, but is positioned laterally outside of the vehicle with respect to the center line 58R in the region of the weakest portion 56R. The distance between the center line 58R and the shear center line 64R is the largest at the center 56CR and gradually decreases with distance from the center 56CR in the vertical direction.

Although not shown in detail in the drawings, the weakest portion 56L of the connecting rod 40L also has the same configuration as the weakest portion 56R except that the relationship in the left-right direction with respect to the center plane 30 of the vehicle 10 is opposite. Therefore, the connecting rods 40L and 40R make a mirror image relationship with each other as seen in the front-rear direction of the vehicle 10.

The value Pb preset for the buckling deformation is a value at which the connecting rods 40L and 40R are buckled to be deformed at the weakest portions 56L and 56R, respectively in preference to damages of the swing member 36 and the actuator 38 in a situation where compressive loads act on the connecting rods. Therefore, when a buckling load P equal to or higher than Pb acts on any one of the connecting rods, the connecting rod is buckled to be deformed without damaging the swing member 36 and the actuator 38. An imaginary line in FIG. 3 shows an example of a shape after buckling deformation of the connecting rod 40R. Conversely, when a compressive load P acting on the connecting rod is less than the preset value Pb, the connecting rod is not buckled to be deformed.

As shown in FIG. 1 and FIG. 3, the front wheels 12L and 12R include metallic wheel members 66L and 66R rotatably supported by the wheel carriers 16L and 16R, respectively, and mainly rubber tires 68L and 68R mounted on the outer peripheries (rim portions) of the wheel members. As shown in FIG. 2, the centers 56CL and 56CR of the weakest portions 56L and 56R are located above the upper edges 66UL and 66UR of the portions of the corresponding wheel members 66L and 66R which are closest to the centers 56CL and 56CR, respectively. In particular, the centers 56CL and 56CR are preferably located above the upper edges 68UL and 68UR of the portions of the corresponding tires 68L and 68R closest to the centers 56CL and 56CR.

FIRST TO FIFTH MODIFIED EMBODIMENTS

FIGS. 5 to 9 are transverse sectional views showing the first to fifth modified embodiments, respectively, of the connecting rod 40R in the automatic tilting vehicle according to the present disclosure. In FIGS. 5 to 9, the same reference numerals as those denoted in FIG. 4 are attached to the same members as the members shown in FIG. 4. Although not shown in the figures, the connecting rod 40L has the same shape except that the cross-sectional shape has a mirror image relation with the cross-sectional shape of the connecting rod 40R. These also apply to the second embodiment and the sixth modified embodiment described later.

Similar to FIG. 4, FIGS. 5A to 9A each show the cross section of the connecting rod 40R in the region other than the weakest portion 56R and FIGS. 5B to 9B each show the cross section of the connecting rod 40R at the center of the weakest portion 56R. FIGS. 5C to 9C each show a modification of the cross section of the connecting rod 40R at the center of the weakest portion 56R.

First Modified Embodiment

Figure 5A:
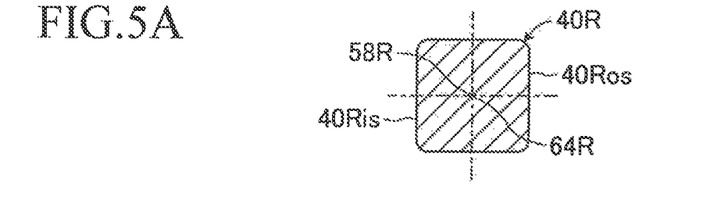
FIG. 5A is an enlarged sectional view showing a cross section of a region other than the preset weakest portion of the right connecting rod in a first modified embodiment.
Figure 5B:
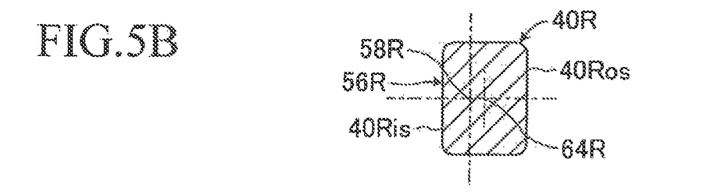
FIG. 5B is an enlarged sectional view showing a cross section at the center of the preset weakest portion of the right connecting rod in the first modified embodiment.
Figure 5C:
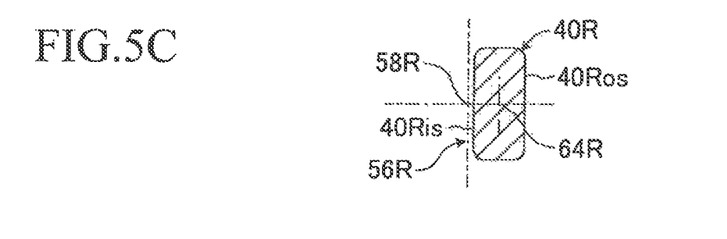
FIG. 5C shows a modification of the cross section at the center of the preset weakest portion of the right connecting rod in the first modified embodiment.

In the first modified embodiment shown in FIG. 5, the connecting rod 40R is a solid rod member having, as shown in FIG. 5A, a substantially square cross-sectional shape except for the weakest portion 56R. An outer surface 40Ros and an inner surface 40Ris excluding the weakest portion 56R of the connecting rod 40R extends along one plane parallel to the center line 58R. In the weakest portion 56R, the inner surface 40Ris is located at a position close to the outer surface 40Ros and the cross-sectional shape of the weakest portion 56R is substantially rectangular long in the front-rear direction. A distance between the outer surface 40Ros and the inner surface 40Ris is the smallest at the center 56CR of the weakest portion 56R and gradually increases with distance from the center 56CR in the vertical direction.

As shown in FIG. 5B, the inner surface 40Ris at the center 56CR is located on the inner side in the lateral direction of the vehicle with respect to the center line 58R. However, as shown in FIG. 5C, the inner surface 40R may be located laterally outside of the vehicle with respect to the center line 58R. This also applies to other modifications described later. In FIGS. 5B and 5C, the width of the weakest portion 56R in the vehicle longitudinal direction is the same as the width in the vehicle longitudinal direction of a portion other than the weakest portion, but as in the third and fifth modifications, it may be larger than the width in the vehicle longitudinal direction of a portion other than the weakest portion.

A shearing center line 64R of the connecting rod 40R is located at the cross-sectional center of the cross section of the connecting rod. Therefore, the shearing center line 64R is located at the same position as the center line 58R in regions other than the weakest portion 56R, but in the region of the weakest portion 56R, the shearing center line 64R is located at the position laterally outward of the vehicle with respect to the center line 58R. The distance between the center line 58R and the shear center line 64R is the largest at the center 56CR and gradually decreases with distance from the center 56CR in the vertical direction. These matters concerning the shear center line 64R apply to the second to sixth modified embodiments which will be described later.

Second Modified Embodiment

Figure 6A:
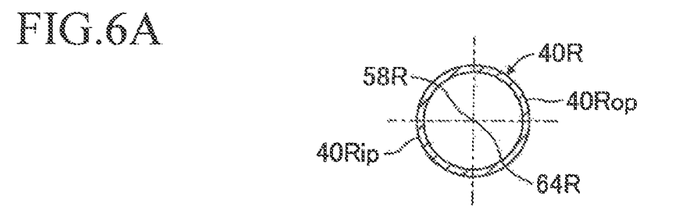
FIG. 6A is an enlarged sectional view showing a cross section of a region other than the preset weakest portion of the right connecting rod in a second modified embodiment.
Figure 6B:
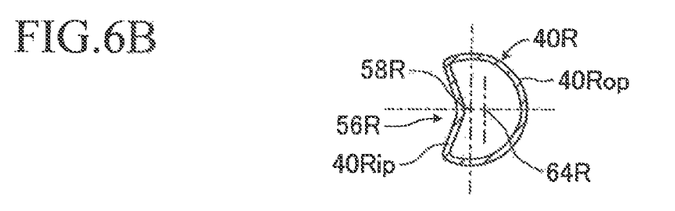
FIG. 6B is an enlarged sectional view showing a cross section at the center of the preset weakest portion of the right connecting rod in the second modified embodiment.
Figure 6C:
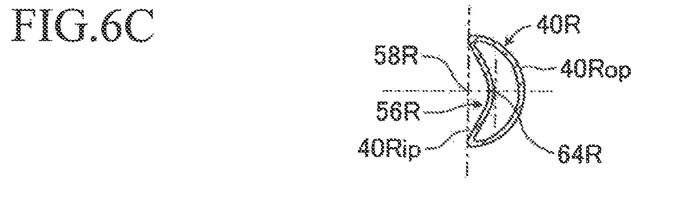
FIG. 6C shows a modification of the cross section at the center of the preset weakest portion of the right connecting rod in the second modified embodiment.

In the second modified embodiment shown in FIG. 6, the connecting rod 40R is a tubular member having a circular cross-sectional shape except for the weakest portion 56R as shown in FIG. 6A. An outer peripheral portion 40Rop and an inner peripheral portion 40Rip excluding the weakest portion 56R of the connecting rod 40R extend along one cylindrical surface extending along the center line 58R. In the weakest portion 56R, the inner peripheral portion 40Rip is located at a position close to the outer peripheral portion 40Rop, and the cross-sectional shape of the weakest portion 56R is substantially heart-shaped. A distance between the inner peripheral portion 40Rip and the outer peripheral portion 40Roop is the smallest at the center 56CR of the weakest portion 56R and gradually increases with distance from the center 56CR in the vertical direction.

As shown in FIG. 6B, the inner peripheral portion 40Rip at the center 56CR is located on the inner side in the lateral direction of the vehicle with respect to the center line 58R. However, as shown in FIG. 6C, the inner peripheral portion 40Rip at the center 56CR may be located on the lateral outside of the vehicle with respect to the center line 58R. This also applies to the third modified embodiment described later.

Third Modified Embodiment

Figure 7A:
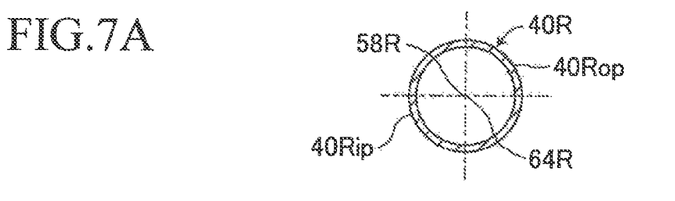
FIG. 7A is an enlarged sectional view showing a cross section of a region other than the preset weakest portion of the right connecting rod in a third modified embodiment.
Figure 7B:
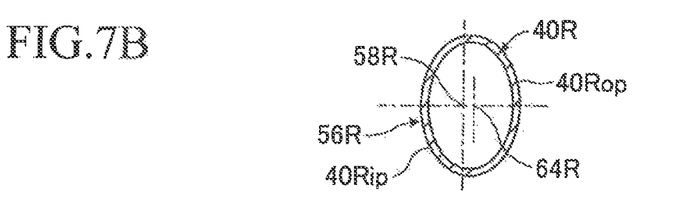
FIG. 7B is an enlarged sectional view showing a cross section at the center of the preset weakest portion of the right connecting rod in the third modified embodiment.
Figure 7C:
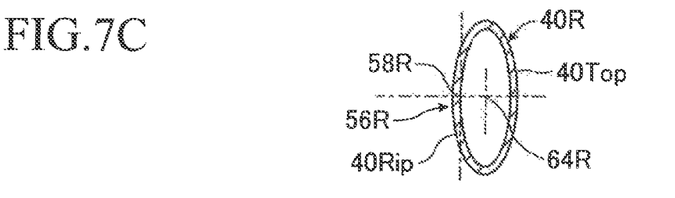
FIG. 7C shows a modification of the cross section at the center of the preset weakest portion of the right connecting rod in the third modified embodiment.

In the third modified embodiment shown in FIG. 7, as shown in FIG. 7A, similar to the second modified embodiment, the connecting rod 40R is a tubular member having a circular cross-sectional shape except for the weakest portion 56R. The outermost portion of the outer peripheral portion 40Rop of the connecting rod 40R extends along one straight line parallel to the center line 58R. In the weakest portion 56R, the inner peripheral portion 40Rip and the outer peripheral portion 40Ro of the connecting rod 40R have an elliptical shape in which a long axis aligns substantially with the longitudinal direction of the vehicle. A ratio of the length of the long axis to the length of a short axis is largest at the center 56CR of the weakest portion 56R and gradually decreases with distance from the center 56CR in the vertical direction.

Fourth Modified Embodiment

Figure 8A:
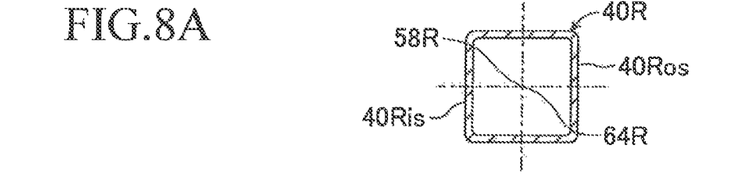
FIG. 8A is an enlarged sectional view showing a cross section of a region other than the preset weakest portion of the right connecting rod in a fourth modified embodiment.
Figure 8B:
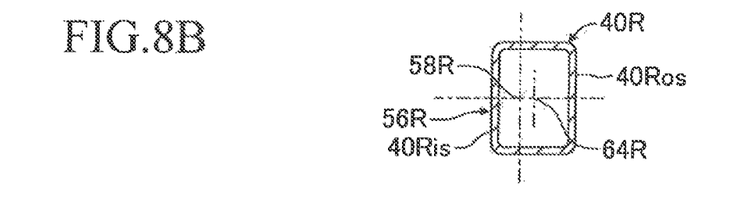
FIG. 8B is an enlarged sectional view showing a cross section at the center of the preset weakest portion of the right connecting rod in the fourth modified embodiment.
Figure 8C:
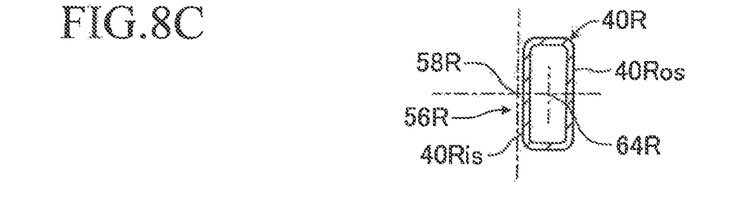
FIG. 8C shows a modification of the cross section at the center of the preset weakest portion of the right connecting rod in the fourth modified embodiment.

In the fourth modified embodiment shown in FIG. 8, as shown in FIG. 8A, the connecting rod 40R is a tubular member having a substantially square cross-sectional shape except for the weakest portion 56R. The outer surface 40Ros and the inner surface 40Ris excluding the weakest portion 56R of the connecting rod 40R extend along one plane parallel to the center line 58R. A front surface and a rear surface of the connecting rod 40R also extend along one plane parallel to the center line 58R.

The inner surface 40Ris is located at a position close to the outer surface 40Ros in the weakest portion 56R, and the cross-sectional shape of the weakest portion 56R is a substantially rectangular hollow which is long substantially in the front-rear direction. A distance between the outer surface 40Ros and the inner surface 40Ris is the smallest at the center 56CR of the weakest portion 56R and gradually increases with distance from the center 56CR in the vertical direction.

Fifth Modified Embodiment

Figure 9A:
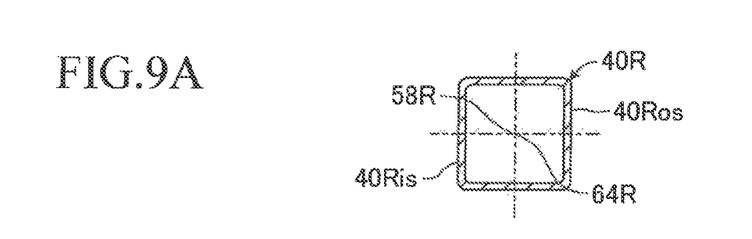
FIG. 9A is an enlarged sectional view showing a cross section of a region other than the preset weakest portion of the right connecting rod in a fifth modified embodiment.
Figure 9B:
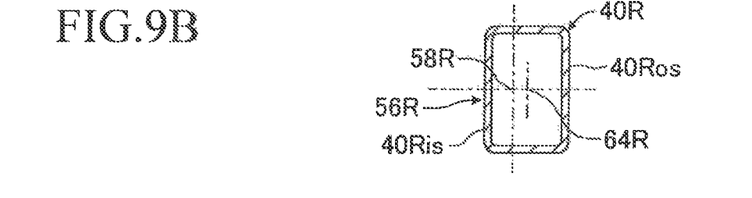
FIG. 9B is an enlarged sectional view showing a cross section at the center of the preset weakest portion of the right connecting rod in the fifth modified embodiment.
Figure 9C:
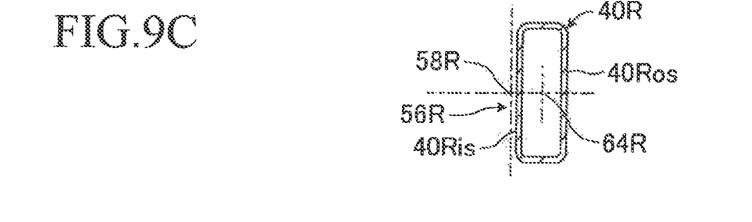
FIG. 9C shows a modification of the cross section at the center of the preset weakest portion of the right connecting rod in the fifth modified embodiment.

In the fifth modified embodiment shown in FIG. 9, as shown in FIG. 9A, similar to the fourth modified embodiment, the connecting rod 40R is a tubular member having a substantially square cross-sectional shape except for the weakest portion 56R. The weakest portion 56R is also in the same form as the weakest portion of the fourth modified embodiment, but the spacing between the front and rear surfaces of the weakest portion 56R is larger than the spacing between the front and back surfaces in regions other than the weakest portion 56R, and is the largest at the center 56CR of the weakest portion 56R.

Rod members and tubular members constituting the connecting rods 40L and 40R of the first embodiment and the first to fifth modified embodiments may be members formed by extruding or withdrawing a steel material. Further, the weakest portions 56L and 56R in the first embodiment and the first to fifth modified embodiments may be formed by hot or cold forging or press working.

Second Embodiment

Figure 10A:
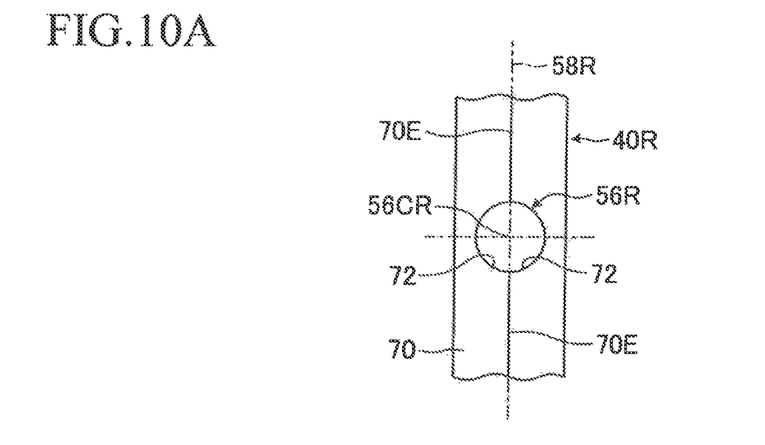
FIG. 10A is a partial view of the right connecting rod in a second embodiment of the automatic tilting vehicle according to the present disclosure as seen from the inside of the vehicle.
Figure 10B:
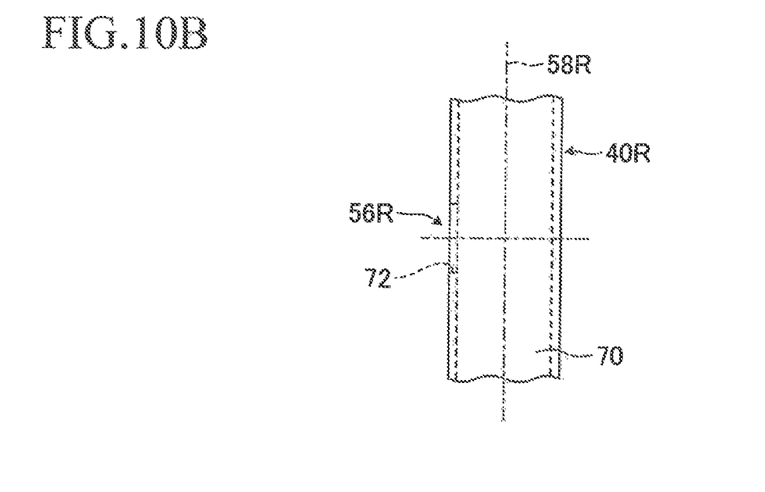
FIG. 10B is a partial view of the right connecting rod in the second embodiment as seen from behind the vehicle.
Figure 10C:
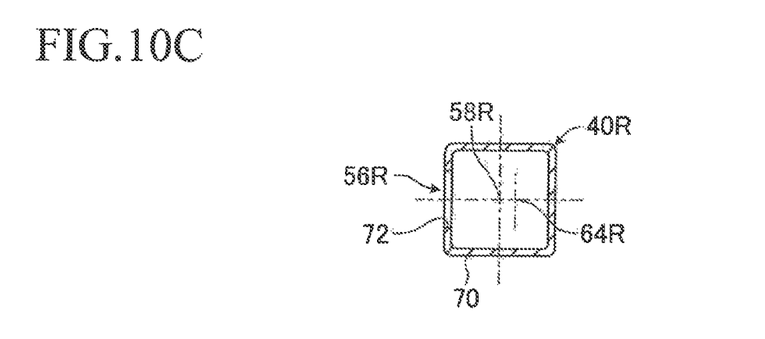
FIG. 10C shows the cross section of the right connecting rod in the region of the preset weakest portion of the right connecting rod in the second embodiment.

FIG. 10 is an illustration showing a connecting rod 40R in a second embodiment of the automatic tilting vehicle according to the present disclosure. In particular, FIGS. 10A and 10B are partial views of the connecting rod 40R including the weakest portion 56R as seen from the inside and the rear of the vehicle, respectively. FIG. 10C is a sectional view of the connecting rod 40R in the region of the weakest portion 56R.

In the second embodiment, the connecting rod 40R is formed, for example, by pressing a steel plate 70 into a box shape having a square cross section. Two side edges 70E of the steel plate 70 are in contact with each other along the center line 58R of the connecting rod 40R as viewed from the inside of the vehicle. The two side edges 70E are provided with semicircular cutouts 72 aligned with each other in a direction perpendicular to the center line 58R and these notches 72 form a substantially circular preset weakest portion 56R.

Sixth Modified Embodiment

Figure 11A:
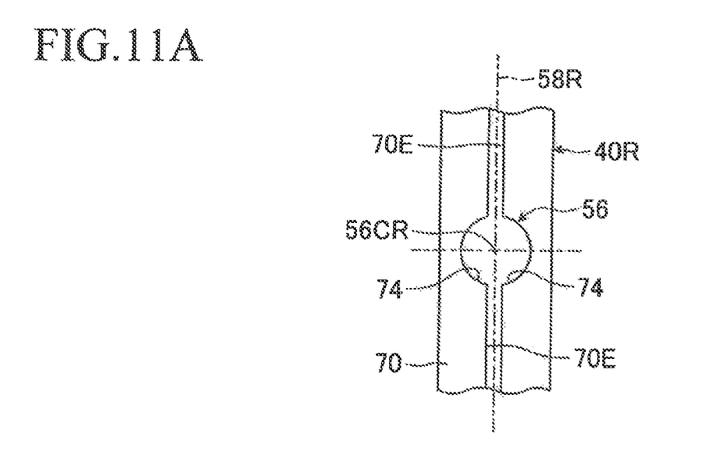
FIG. 11A is a partial view of the connecting rod in a sixth modified embodiment of the automatic tilting vehicle according to the present disclosure as seen from the inside of the vehicle.
Figure 11B:
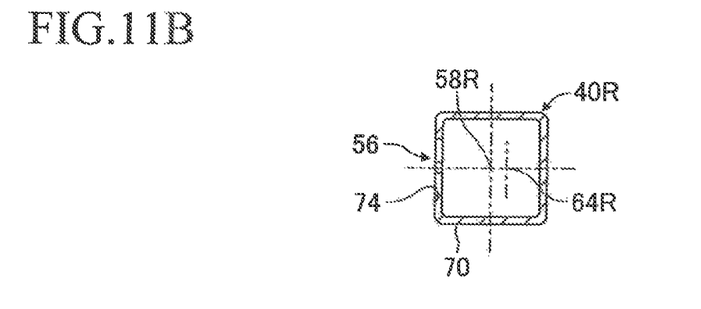
FIG. 11B is an enlarged sectional view showing a cross section at the center of the preset weakest portion of the right connecting rod in the sixth modified embodiment.

FIG. 11 is an illustration showing a sixth modified embodiment of the connecting rod 40R in the automatic tilting vehicle according to the present disclosure. In particular, FIG. 11A is a partial view of the connecting rod 40R including the weakest portion 56R as seen from the inside of the vehicle, and FIG. 11B is a cross sectional view of the connecting rod in the region of the weakest portion 56R.

In the sixth modified embodiment, the connecting rod 40R is formed, for example, by pressing a steel plate 70 into a box shape having a square cross section as in the second embodiment. However, two side edges 70E of the steel plate 70 do not abut each other but extend parallel to each other along the center line 58R of the connecting rod 40R as viewed from the inside of the vehicle. The two side edges 70E are provided with partial circular cutouts 74 aligned with each other in the direction perpendicular to the center line 58R and these notches 74 form a substantially circular preset weakest portion 56R.

As can be understood from the above descriptions, according to each of the embodiments and modified embodiments described above, the preset weakest portions 56L and 56R are provided at the intermediate portions of the connecting rods 40L and 40R, respectively. When a buckling load P equal to or larger than the preset value Pb is applied to the connecting rods 40L and 40R, the weakest portions 56L and 56R each cause the connecting rod to buckle to deform in a preset direction in a preset region. Therefore, since the load acting on the connecting rod is absorbed by the buckling deformation of the connecting rod, a load transmitted from the connecting rod to the swing member and the actuator is reduced. Consequently, it is possible to reduce the possibility that the swing member and the actuator are damaged when a high impact load is applied to the front wheels, as compared with the conventional automatic tilting vehicle in which no preset weakest portions are provided in the connecting rods.

As described above, the preset value Pb is a value at which the connecting rods 40L and 40R are buckled to be deformed by the weakest portions 56L and 56R in preference to damages of the swing member 36 and the actuator 38 in a situation where compressive loads act on the connecting rods. Therefore, for example, when a high impact load is applied due to any one of the front wheels riding over an obstacle and a high buckling load of Pb or more acts on the corresponding connecting rod, the connecting rod is buckled to be deformed without damaging the swing member 36 and the actuator 38. Consequently, as compared with the conventional automatic tilting vehicle in which no preset weakest portions 56L and 56R are provided in the connecting rods 40L and 40R, it is possible to effectively reduce the possibility that the swing member 36 and the actuator 38 are damaged when a high impact load is applied to one of the front wheels.

Even if a high compressive load acts on the connecting rod 40L or 40R, when the compressive load is less than the preset value Pb, the connecting rod will not be buckled to be deformed. Is not impaired the function of the vehicle tilting device that tilts the vehicle to the inside of a turn by swinging the swing member 36 about the swing axis 34 so that the pair of connecting rods 40L and 40R are moved up and down in opposite directions to vertically move the left and right wheels 12L and 12R in opposite directions with respect to the vehicle body 24.

In general, a price of the connecting rods 40L and 40R is less than prices of the swing member 36 and the actuator 38, and replacement of the connecting rod is easier than those of the swing member and actuator. Therefore, as compared to where the swing member 36 or the actuator 38 is damaged preferentially over the connecting rods 40L and 40R, it is possible to reduce the parts replacement cost and to exchange parts easily and in a short time.

The preset area is the areas of weakest portions 56L and 56R, that is, the center 56CL and 56CR of the weakest portions and the surrounding areas, and the preset direction is outward in the lateral direction of the vehicle as viewed from above the vehicle 10. Consequently, when a buckling load P equal to or larger than the preset value Pb is applied to the connecting rods 40L and 40R, the weakest portions 56L and 56R are buckled to be deformed laterally outwardly of the vehicle 10, respectively. Therefore, as compared to where the connecting rods are buckled to be deformed in a direction other than the lateral outside of the vehicle 10, it is possible to reduce the possibility of damaging the internal structure 41 or the like positioned between the pair of connecting rods by buckling deform of the connecting rods 40L and 40R.

The preset direction in the above embodiments and modified embodiments is laterally outward perpendicular to the center plane 30 as viewed from above the vehicle 10. However, it is to be noted that the preset direction may be a direction inclined in the range of 30 degrees or less, preferably 20 degrees or less, more preferably 10 degrees or less to the front or rear of the vehicle with respect to the lateral outer direction perpendicular to the center plane 30.

When the vehicle 10 is traveling, a longitudinal force due to a longitudinal force acting between the front wheels 12L and 12R and the vehicle body 24 acts on the connecting rods 40L and 40R. Since the direction of the buckling deformation of the connecting rods 40L and 40R is laterally outward of the vehicle 10, it is possible to reduce the possibility that the strength of the connecting rod will be insufficient with respect to a longitudinal force as compared to where the buckling deformation direction is the front or rear direction of the vehicle.

Further, the centers 56CL and 56CR of the weakest portions 56L and 56R are located above the upper edges 66UL and 66UR of the portions of the corresponding wheel members 66L and 66R which are closest to the centers 56CL and 56CR, respectively. Therefore, as compared to where the centers 56CL and 56CR are positioned below the upper edges 66UL and 66UR of the wheel member at the portions closest to their centers, it is possible to reduce the possibility that rotation of the front wheel is hindered due to the connecting rod being brought into contact with the wheel member due to buckling deformation.

In particular, according to the embodiments and modified embodiments described above, as shown in FIGS. 1 to 3, the centers 56CL and 56CR are located above the upper edges 68UL and 68UR of the portions of the corresponding tires 68L and 68R which are closest to the centers 56CL and 56CR, respectively. Therefore, as compared to where the centers 56CL and 56CR are positioned lower than the upper edges 68UL and 68UR of the tires, it is possible to reduce the possibility that the smooth rotation of the front wheels is hindered due to the fact that the connecting rods make contact with the tires due to buckling deformation and deforms the tires.

In particular, according to the first embodiment and the first to fifth modified embodiments, since the connecting rods 40L and 40R are not provided with holes for forming the weakest portions 56L and 56R, no muddy water invades the interior of the connecting rods. Therefore, as compared with the second embodiment and the sixth modified embodiment, the durability of the connecting rods can be increased.

Further, according to the second, third and fifth modified embodiments, the weakest portions 56L and 56R can be formed by press working a tubular member. Therefore, the connecting rods 40L and 40R can easily be manufactured as compared with the first and second embodiments and other modified embodiments.

Although the present disclosure has been described in detail with reference to specific embodiments and modified embodiments, it will be apparent to those skilled in the art that the present disclosure is not limited to the above-described embodiments and modified embodiments, and various other embodiments are possible within the scope of the present disclosure.

For example, in the above-described embodiments and modified embodiments, the dimensions of the transverse cross-sectional shapes of the connecting rods 40L and 40R in the portions other than the weakest portions 56L and 56R are the same in the vehicle longitudinal direction and the lateral direction. However, the dimensions of the transverse cross-sectional shapes in the front and rear direction and in the lateral direction may be different from each other. In particular, when the dimension in the vehicle longitudinal direction is larger than that in the lateral direction, the strength of the connecting rod against a vehicle longitudinal force can be made higher than the embodiments and the modified embodiments described above.

Further, in the above-described embodiments and modified embodiments, the centers 56CL and 58CR of the weakest portions 56L and 56R are located above the upper edges 68UL and 68UR of the portions of the corresponding tires 68L and 68R which are closest to the centers 56CL and 56CR, respectively. However, if there are sufficient lateral spaces between the weakest portions and the front wheels and the connecting rods do not contact with the front wheels even when the connecting rods are buckled to be deformed, the centers 56CL and 56CR may be located below the upper edges 66UL and 66UR of the corresponding wheel members 66L and 66R which are closest to their centers.

In the second embodiment and the sixth modified embodiment described above, the cutouts 60 and 62, respectively form the substantially circular weakest portion 56R. However, a shape of the weakest portion formed by the cutouts (hole) may be a shape other than a circle such as an ellipse, a rhombus or the like, and shapes such as an ellipse and a rhombus are long in the extending direction of the connecting rod.

Further, in the above-described embodiments and modified embodiments, the actuator 38 is supported so as to be swingable about the pivot shafts 48 by supporting a pair of pivot shafts 48 provided at the center portion in the longitudinal direction thereof by the pair of brackets 46. The output rotary shaft of the actuator 38 protrudes rearward and the boss portion 36B of the swing member 36 is integrally attached to the tip of the output rotary shaft. However, as long as the connecting rods 40L and 40R can be vertically moved in opposite phases by swinging the swing member 36 about the swing axis 34 extending in the front-rear direction, the vehicle tilting device 18 may have any configuration.

For example, the arm portions 36AL and 36AR of the swing member 36 are V-shaped so as to have a height that increases with distance from the boss portion 36. However, the arm portions 36AL and 36AR may be formed in a straight line without being inclined with respect to each other and may extend horizontally when the vehicle 10 is in the standard state. Further, the arm portions may be formed in an inverted V shape so that the height decreases with distance from the boss portion 36B.

What is claimed is:

1. An automatic tilting vehicle which comprises a pair of wheels spaced laterally and supported rotatably by corresponding wheel carriers and a vehicle tilting device configured to tilt the vehicle to the inside of a turn when the vehicle is turning, the vehicle tilting device including a swing member swinging about a swing axis extending in the front-rear direction, an actuator that is configured to swing the swing member about the swing axis, and a pair of connecting rods pivotally attached to the swing member at upper end pivoting portions and pivotally attached to corresponding wheel carriers at lower end pivoting portions on both lateral sides, wherein
    each connecting rod has a preset weakest portion configured to be buckled to deform the connecting rod in a preset direction in a preset area when a buckling load equal to or larger than a preset value is applied.

2. The automatic tilting vehicle according to claim 1, wherein the preset direction is laterally outward of the vehicle as seen from above the vehicle.

3. The automatic tilting vehicle according to claim 1, wherein the preset value is a value at which a connecting rod is buckled to be deformed at the preset weakest portion in preference to damages of the swing member and the actuator in a situation where a compressive load acts on the connecting rod.

4. The automatic tilting vehicle according to claim 1, wherein the pair of wheels each includes a wheel member rotatably supported by the wheel carrier and a tire mounted on an outer periphery of the wheel member, and a center of the preset weakest portion is located above an upper edge of a portion of the corresponding wheel member closest to the center.

5. The automatic tilting vehicle according to claim 4, wherein the center of the preset weakest portion is located above an upper edge of a portion of the corresponding tire that is closest to the center.

* * * * *